United States Patent [19]

Walker

[11] Patent Number: 5,325,945

[45] Date of Patent: Jul. 5, 1994

[54] VEHICLE BRAKE SUPPORT ASSEMBLY

[75] Inventor: Donald G. Walker, Sterling Heights, Mich.

[73] Assignee: Rockwell International Corporation, Pittsburgh, Pa.

[21] Appl. No.: 950,583

[22] Filed: Sep. 23, 1992

[51] Int. Cl.$^5$ ............................................. F16D 51/00
[52] U.S. Cl. ................................. 188/341; 188/206 A
[58] Field of Search ............ 188/206 A, 206 R, 205 R, 188/341, 78, 325, 327, 328, 329, 330; 192/75, 78, 93 R

[56] References Cited

U.S. PATENT DOCUMENTS

| | | | |
|---|---|---|---|
| 4,102,442 | 7/1978 | Colpaert | 188/206 A |
| 4,337,851 | 7/1982 | Pringle | 188/341 X |
| 4,858,730 | 8/1989 | Baroni | 188/205 R |

Primary Examiner—Robert J. Oberleitner
Assistant Examiner—Lee W. Young

[57] ABSTRACT

A brake support assembly for a vehicle including a stamped metal spider having a planar mounting portion and a pair of diametrically opposed support portions. A first support portion includes a first pair of ribs extending along opposite edges thereof as involuted ribs. A second support portion includes a second pair of ribs extending along opposite edges thereof to form flanges. A bracket extends across and connects the first pair of ribs. The bracket and the first support portion of the spider include laterally spaced apertures which receive press fit sleeve-type bushings. Anchor pins disposed in said sleeve-type bushings carry one end of a pair of brake shoes each comprised of a pair of spaced generally parallel webs secured to a table. The opposite end of the brake shoes is supported by cam follower rollers. Springs bias the brake shoes into contact with a cam actuator which may be rotated to displace the brake shoes. In the preferred embodiment of the present invention, the first pair of reinforcing ribs is terminated at a transition section extending from the planar first support portion as a rib of decreasing length to a total transition. The second pair of reinforcing ribs includes a termination section extending from the second support portion to the mounting portion as a flange having an orthogonally extending portion of decreasing length such that the termination section is completed when the radially extending portion of the flanges is coplanar to the plane of the mounting portion.

2 Claims, 4 Drawing Sheets

VEHICLE BRAKE SUPPORT ASSEMBLY

BACKGROUND OF THE INVENTION

1. Field of the Invention

The present invention is directed to a vehicle brake support assembly for an internally expanding drum brake assembly and, more specifically, to a vehicle brake support assembly for a drum brake which is utilized in heavy duty trucks which include a pair of dual web brake shoes.

2. Description of the Related Art

Heavy duty truck brakes usually include a pair of brake shoes having adjacent ends seated for pivotal movement on a cylindrical surface of a pair of anchor pins mounted to a support plate, often referred to as a "spider" which in turn is secured to a vehicle axle or axle housing. The support plate is usually of elongate form. A rotatable actuating cam and shaft is mounted to the support plate at the end opposite the anchor pins with the cam disposed between the other ends of the brake shoes. During actuation, rotary movement of the cam causes each of the brake shoes to overcome the biasing force of a return spring and to pivot outwardly about the anchor pins into contact with the radially inwardly facing friction surface of a brake drum secured for rotation with a vehicle wheel. The support plate or spider serves as the foundation of the brake assembly and is subject to substantial stress under dynamic braking conditions.

Support plates have therefore traditionally been formed as heavy cast and/or forged members with appropriate areas machined and bored to accommodate the anchor pins and the actuating shaft, and for mounting the support plate to the axle. Such traditional support plates have therefore been expensive to manufacture because of the mass of metal and machining operations required and increased the weight of the vehicles thereby reducing the economics of operation thereof.

SUMMARY OF THE PRESENT INVENTION

The present invention is a brake support assembly for a vehicle including a stamped metal spider having a planar mounting portion and a pair of diametrically opposed support portions. A first support portion includes a first pair of ribs extending along opposite edges thereof as involuted ribs. A second support portion includes a second pair of ribs extending along opposite edges thereof to form flanges. A bracket extends across and connects the first pair of ribs. The bracket and the first support portion of the spider include laterally spaced apertures which receive press fit sleeve-type bushings. Anchor pins disposed in said sleeve-type bushings carry one end of a pair of brake shoes each comprised of a pair of spaced generally parallel webs secured to a table. The opposite end of the brake shoes is supported by cam follower rollers. Springs bias the brake shoes into contact with a cam actuator which may be rotated to displace the brake shoes.

In the preferred embodiment of the present invention, the first pair of reinforcing ribs is terminated at a transition section extending from the planar first support portion as a rib of decreasing length to a total transition. The second pair of reinforcing ribs includes a termination section extending from the second support portion to the mounting portion as a flange having an orthogonally extending portion of decreasing length such that the termination section is completed when the radially extending portion of the flanges is coplanar to the plane of the mounting portion.

These and other aspects of the present invention will become more readily apparent by reference to the following detailed description of the embodiments as shown in the drawings.

DETAILED DESCRIPTION OF THE PREFERRED EMBODIMENT

Figure 1:
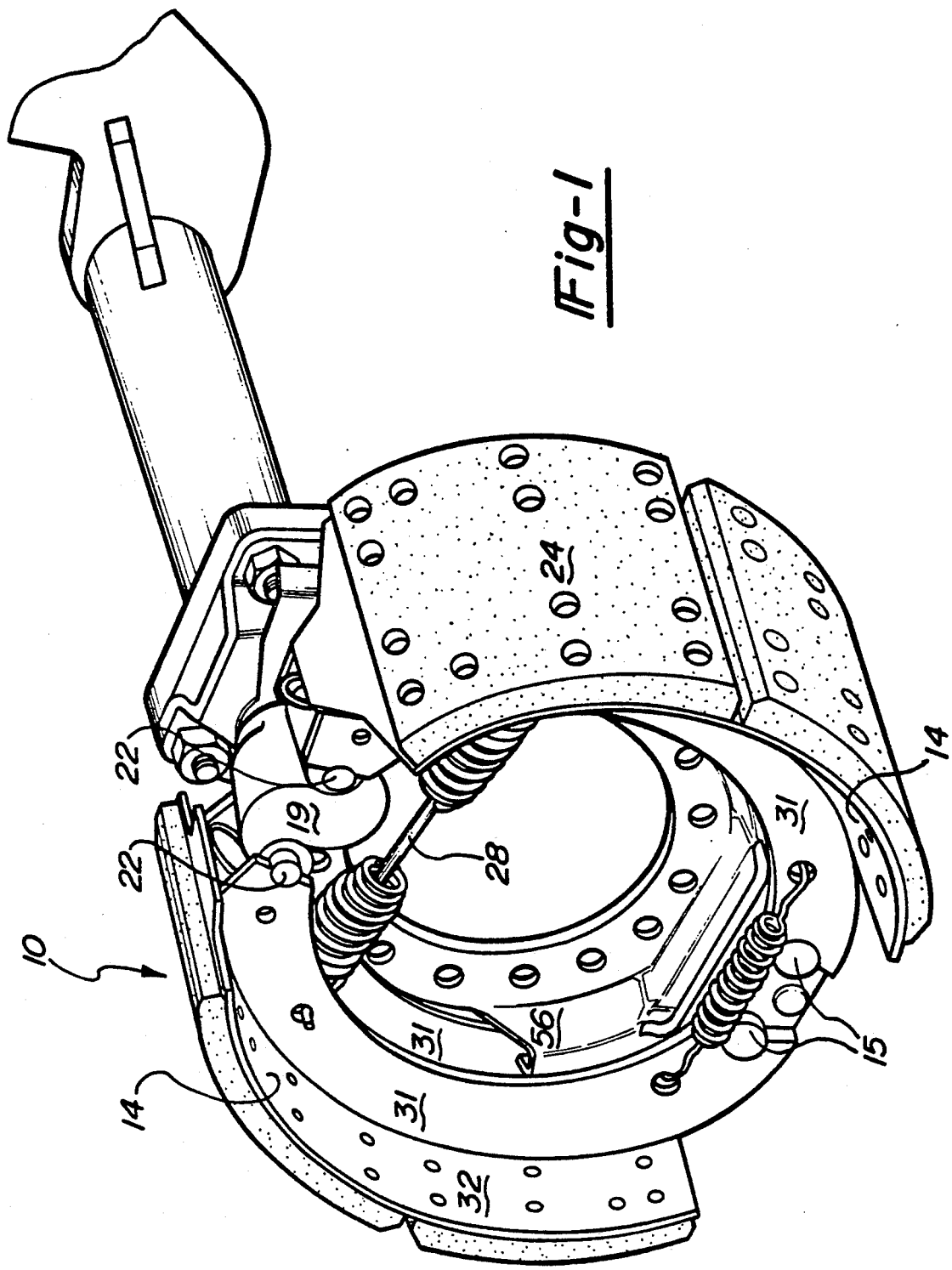
FIG. 1 is a perspective view of the brake assembly of the present invention.
Figure 2:
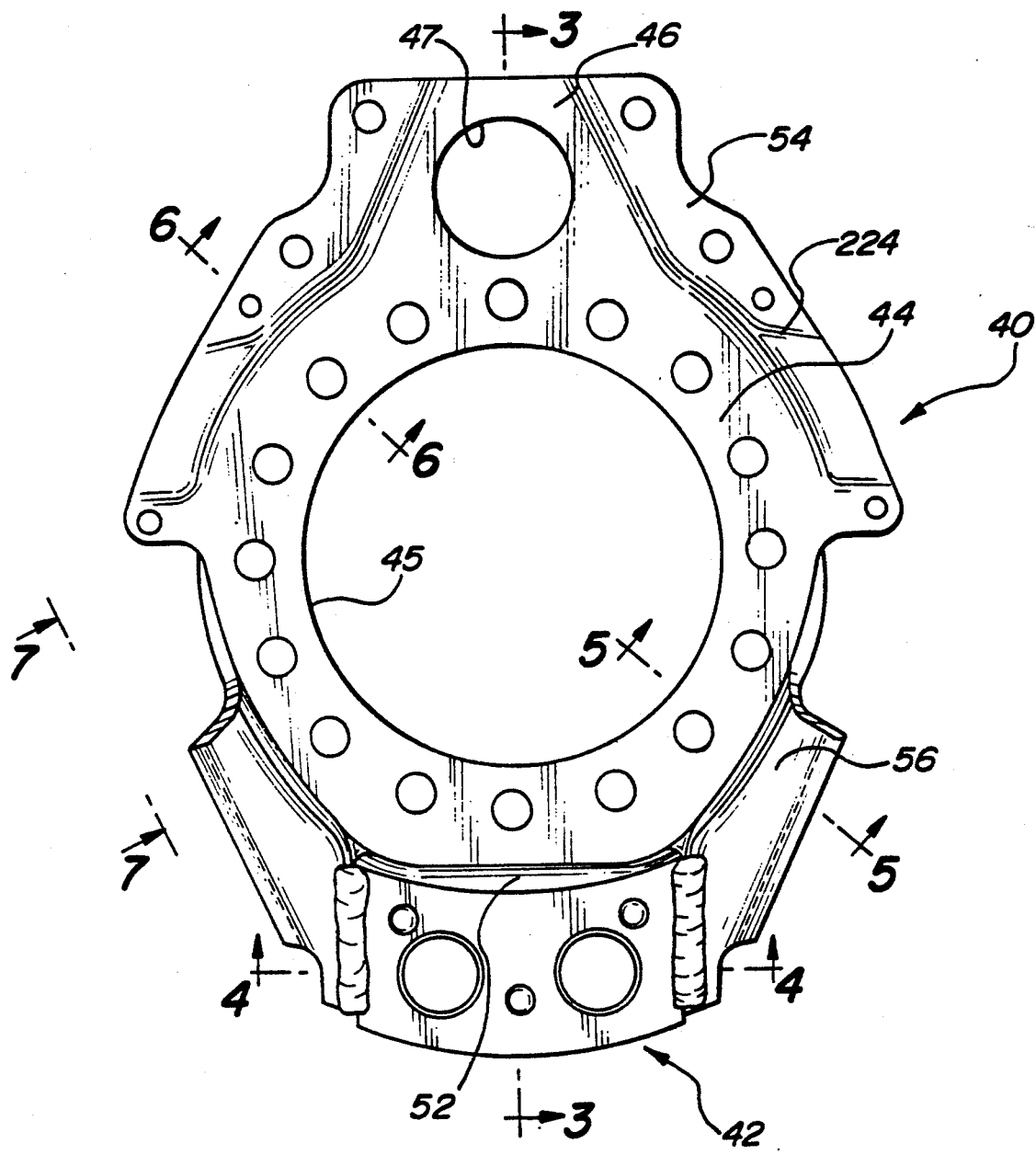
FIG. 2 is a plan view of the brake support of the present invention.

The present invention as shown in FIG. 1 features a cam actuated brake assembly 10 which includes a pair of brake shoes 14 each of which is pivotally mounted at one end to cylindrical anchor pins 15, 15. Cam 19 is mounted for rotary movement between adjacent ends of brake shoes 14, 14 opposite anchor pins 15, 15. Brake shoes 14, 14 are each provided with a roller type cam follower 22. Cam 19 is rotated by conventional means (not shown) in a counter-clockwise direction through an arc. Cam 19 provides an outwardly directed force to rollers 22 and brake shoes 14 which cause the brake shoes to pivot about anchor pins 15, 15. This movement forces friction linings 24 into contact with an inwardly facing friction surface of a brake drum (not shown). When the brakes are released, brake shoes 14 and friction lining pads 24 are withdrawn from contact with the brake drum by return spring 28 secured at its opposite ends to brake shoe webs 31, 31. Brake shoes 14, 14 are dual web fabricated brake shoes. That is, each brake shoe includes a pair of axially spaced webs 31, 31 secured to a table 32. Webs 31, 31 are flat in a radial direction and curved in a longitudinal or circumferential direction. Brake shoe table 32 is curved in the circumferential direction and webs 31, 31 are welded in parallel relation along the interior curved portion of the table. This provides a generally rigid assembly of component parts to which friction lining pads 24 may be secured by rivets or by chemical bonding.

Figure 3:
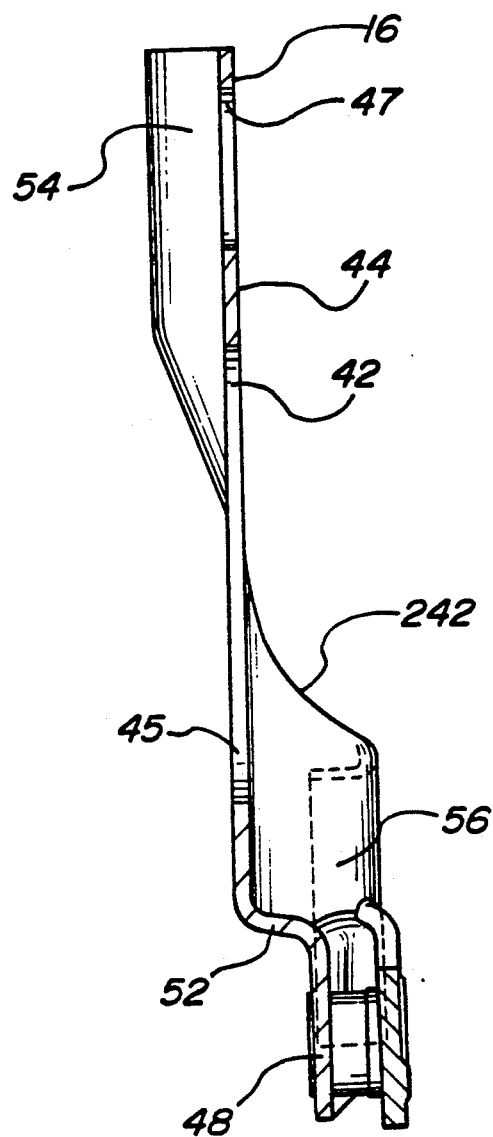
FIG. 3 is a side view of the brake support of the present invention.
Figure 4:
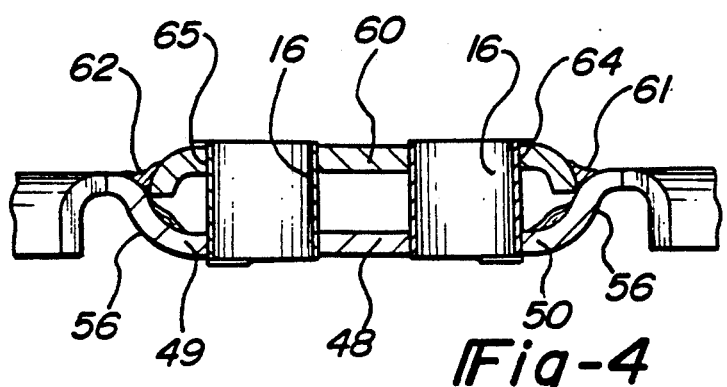
FIG. 4 is a cross-section of FIG. 2 taken along 4—4.
Figure 5:
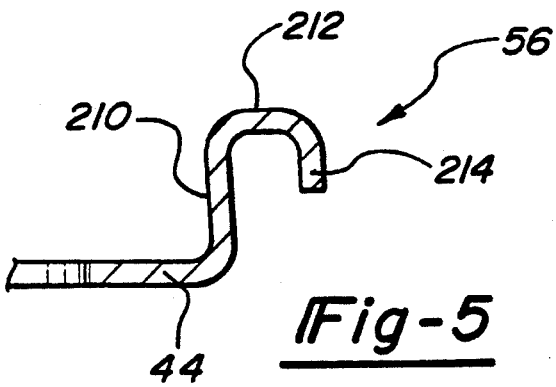
FIG. 5 is a cross-section of FIG. 2 taken along 5—5.
Figure 6:
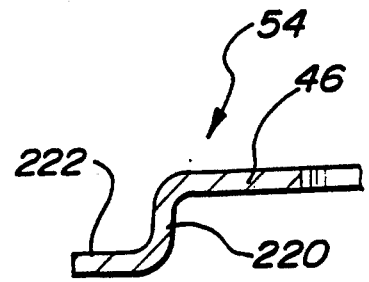
FIG. 6 is a cross-section of FIG. 2 taken along 6—6.
Figure 7:
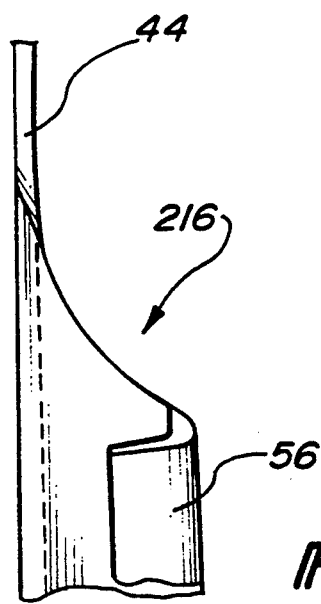
FIG. 7 is a partial side view of the transistor portion of a reinforcing rib of the present invention.

With reference to FIGS. 2 through 7, stamped metal plate 42 which includes a substantially planar and circular mounting portion 44, including apertures, which define a pattern for receiving bolts for affixing plate 42 to a vehicle axle, and planar portions 46 and 48. Support portions 46 and 48 are diametrically opposed along the vertical axis. With reference to FIG. 3 in the preferred embodiment, support portion 46 is coplanar with mounting portion 44 and support portion 48 is axially offset approximately 1.1 inch from mounting portion 44. A circular aperture 45 is provided through mounting portion 44 and a circular aperture 47 is provided through support portion 46. A transition section 52 joins support portion 48 to mounting portion 44. Stamped metal plate 42 includes a pair of reinforcing ribs 56, 56 extending from opposite edges of the mounting portion 44 and support portion 48 having a portion 210 extending orthogonal to the mounting portion 44, a portion 212 extending radially in a plane substantially parallel to support portion 48 and a portion 214 extending orthogonal to portion 48. The portions 210, 212 and 214 are continuously connected to form an involuted rib 56 (as best shown in FIG. 5 and 7). The rib 56 continues from the mounting portion 44 through traction section 52 into support portion 48. Rib 56 is terminated in a transition section 216 extending from support portion 48 into the mounting portion 44 by a reinforcing rib of decreasing length such that a total transition occurs and a rib having no length extends from the opposite edges upon completion of the termination. Stamped metal plate 42 further includes a pair of reinforcing ribs 54 extending from opposite edges of support portion 46 having portion 220 extending orthogonal to support portion 46, and portion 222 extending radially in a plane substantially parallel to the support portion 46. Portions 220, 222 are continuously connected to form a flange as shown in FIG. 6. Rib 54 is terminated in a section 224 between support portion 46 and mounting portion 44 by portion 220 of decreasing length such that portion 222 is coplanar to said mounting portion 44 upon completion of section 224.

A bracket 60 is welded at its opposite ends or laterally spaced edges 61 and 62 to ribs 56. Bracket 60 extends across support portion 48. A pair of bores 64 and 65 in bracket 60 are respectively axially aligned with bores 49 and 50 provided in support portion 48. A pair of stainless steel sleeve-type bushings 16 are respectively seated in bores 49 and 65 and 50 and 64. The ends of the sleeve-type bushings 16 of metal plate 42 are press fit to the bores in bracket 60 and mounting portion 48 to secure bushings 16 in place and thereby support cylindrical anchor pins 15.

The metal plate 42 is formed as a stamped part from a blank cut from ¼ thick SAE 980 XLF, high-strength, low alloy, hot rolled steel sheet strip with mounting portion 44, both support portions 46 and 48, transition section 52 and both reinforcing ribs 54 and 56 all of substantially the same thickness. Aperture 45 in mounting portion 44 and aperture 47 in support portion 46 are formed during the stamping operation. Bores 49 and 50 at support portion 48 of metal plate 42 are rough punched in the stamping operation and machined with bracket bores 64 and 65 after bracket 60 has been welded to reinforcing ribs 56, 56. Bracket 60 is preferably stamped from a blank cut from 5/16" thick SAE 950 XLF hot rolled steel sheet strip with bores 64 and 65 rough punched through the blank. One skilled in the art will appreciate the package efficiency and enhanced strength which is accomplished by locating rib 56 as shown in FIG. 1 in the space defined between webs 31, 31 of the respective brake shoes. Thus, a structurally rigid brake support assembly 40 may be accomplished in limited package space.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A brake support assembly for a vehicle comprising:
   a stamped metal plate having a substantially planar and circular mounting portion;
   diametrically opposed, planar first and second support portions;
   said first support portion being offset from said mounting portion;
   a first transition section respectively joining said first support portion to said mounting portion;
   a first pair of reinforcing ribs extending along opposite edges of said first support portion having a first portion extending orthogonal to said planar first support portion; a second portion extending radially in a plane substantially parallel to said planar first support portion and a third portion extending orthogonal to said second portion, said first, second and third portions being continuously connected to form an involuted rib;
   said first pair of reinforcing ribs being terminated in a second transition section extending from opposite edges of said planar first support portion to said mounting portion;
   said second transition section including an orthogonally extending reinforcing rib of decreasing length to a length of zero in the region of the mounting portion;
   a second pair of reinforcing ribs extending from opposite edges of said second support portion having a first portion extending orthogonal to said planar second support portion and a second portion extending radially in a plane substantially parallel to said planar second support portion, said first and second portions being continuously connected to form a continuous flange;
   a bracket extending across said first support portion in spaced relation thereto and secured by laterally spaced edges welded to said first pair of reinforcing ribs;
   a pair of laterally spaced apertures through said first support portion of said plate and a pair of laterally spaced apertures through said bracket with each aperture through said bracket axially aligned with and of the same diameter as one of said apertures through said first support portion of said plate;
   a pair of sleeve-type bushings press-fit to said laterally spaced and axially aligned apertures provided through said bracket and said first mounting portion of said support plate;
   a pair of anchor pins with each anchor pin having a cylindrical surface supported internally of one of said sleeve-type bushings and each of its ends extending axially from one end of its respective sleeve-type bushing;
   a pair of brake shoes with each brake shoe comprised of a table supporting friction lining material and a pair of spaced generally parallel webs secured to and supporting said table, said brake shoes each having their webs at one end seated for pivoting movement about said one of said anchor pins, the opposite ends of said brake shoe supporting cam follower rollers;
   means biasing said cam following rollers into contact with a cam actuator;
   means for selectively rotating said cam actuator to displace said brake shoes; and
   said first pair of reinforcing ribs disposed in the space defined between said webs of said brake shoes.

2. The invention of claim 1 wherein said second pair of reinforcing ribs extending from said second support portion includes:
 a termination section extending from said second support portion to said mounting portion; said termination section including a first portion extending orthogonal to said second support portion of decreasing length to a region in which said second support portion extending radially in a plane substantially parallel to said second support portion is coplanar proximate with said mounting portion.

* * * * *